US012172449B2

(12) United States Patent
Kobayashi

(10) Patent No.: US 12,172,449 B2
(45) Date of Patent: Dec. 24, 2024

(54) LIQUID EJECTING APPARATUS AND CONTROL METHOD OF LIQUID EJECTING APPARATUS

(71) Applicant: SEIKO EPSON CORPORATION, Tokyo (JP)

(72) Inventor: Satoru Kobayashi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 151 days.

(21) Appl. No.: 18/060,127

(22) Filed: Nov. 30, 2022

(65) Prior Publication Data

US 2023/0166520 A1 Jun. 1, 2023

(30) Foreign Application Priority Data

Dec. 1, 2021 (JP) ................................ 2021-195275

(51) Int. Cl.
*B41J 2/175* (2006.01)
*B41J 2/19* (2006.01)

(52) U.S. Cl.
CPC ....... *B41J 2/17563* (2013.01); *B41J 2/17566* (2013.01); *B41J 2/17596* (2013.01); *B41J 2/19* (2013.01); *B41J 2002/17579* (2013.01)

(58) Field of Classification Search
CPC ............... B41J 2/17563; B41J 2/17566; B41J 2/17596; B41J 2/19; B41J 2002/17579; B41J 2/175; B41J 2/17509; B41J 29/38; B41J 2/01; B41J 2/1721; B41J 29/393
See application file for complete search history.

(56) References Cited

U.S. PATENT DOCUMENTS

2019/0118541 A1* 4/2019 Otsuki ...................... B41J 2/19

FOREIGN PATENT DOCUMENTS

JP 2019077107 A 5/2019

* cited by examiner

*Primary Examiner* — Bradley W Thies
(74) *Attorney, Agent, or Firm* — CHIP LAW GROUP

(57) ABSTRACT

A liquid ejecting apparatus includes: an ejecting portion configured to be able to eject a liquid onto a medium; a supply flow path configured to be able to supply the liquid to the ejecting portion; a liquid storage unit coupled to the supply flow path and configured to be able to store the liquid, the liquid storage unit being a unit in which an air-liquid interface where the liquid and air are in contact is formed; a first filter provided lower than the air-liquid interface and configured to separate the supply flow path and the liquid storage unit; an adjustment mechanism configured to lift a position of the air-liquid interface in the liquid storage unit; and a control unit configured to control the adjustment mechanism.

8 Claims, 1 Drawing Sheet

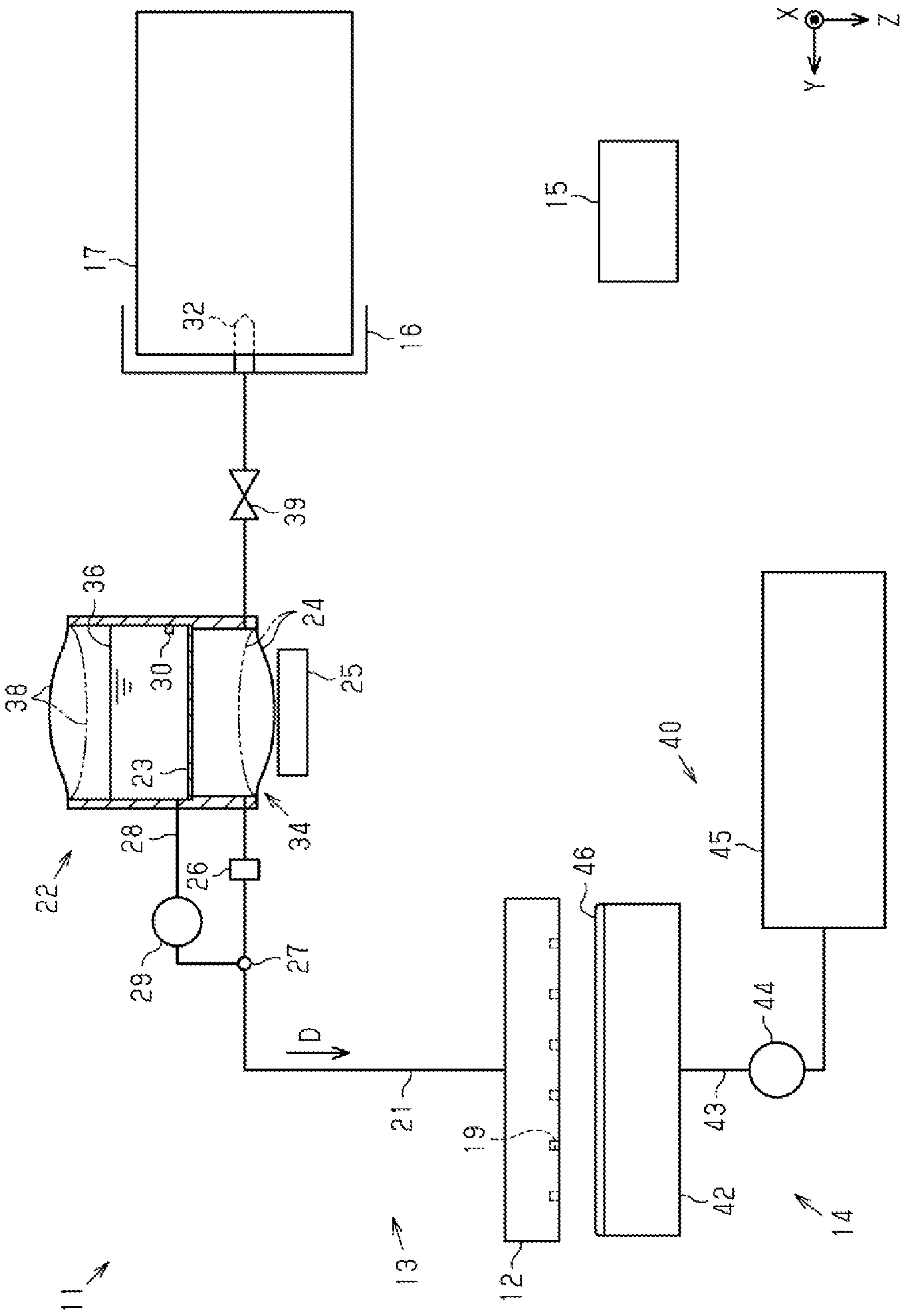
X
Y
Z
17
32
16
15
39
36
24
38
30
25
23
40
34
28
22
26
45
46
29
27
44
D
21
19
43
42
14
13
12
11

LIQUID EJECTING APPARATUS AND CONTROL METHOD OF LIQUID EJECTING APPARATUS

The present application is based on, and claims priority from JP Application Serial Number 2021-195275, filed on Dec. 1, 2021, the disclosure of which is hereby incorporated by reference herein in its entirety.

BACKGROUND

1. Technical Field

The present disclosure relates to a liquid ejecting apparatus such as a printer.

2. Related Art

For example, as in JP-A-2019-77107, there is a liquid ejecting device serving as one example of a liquid ejecting apparatus configured to discharge ink serving as one example of a liquid from a liquid ejecting head serving as one example of an ejecting portion, thereby performing printing. The liquid ejecting device includes a distribution flow path serving as one example of a supply flow path, an air bubble chamber serving as one example of a liquid storage unit, and an air-bubble chamber filter serving as one example of a first filter. The distribution flow path is configured to distribute ink from a liquid supply source to the liquid ejecting head. The air bubble chamber is provided at the distribution flow path. The air bubble chamber is configured to store air bubbles contained in the ink.

The liquid within the air bubble chamber is more likely to contain foreign substances at an air-liquid interface that is in contact with the stored air. The air-bubble chamber filter is provided at a position between the air-liquid interface and the distribution flow path. Thus, the air-bubble chamber filter collects foreign substances generated at the air-liquid interface before these foreign substances flow into the distribution flow path.

In JP-A-2019-77107, the position of the air-liquid interface in the air bubble chamber changes in accordance with the amount of air stored in the liquid storage unit. That is, the air-liquid interface when the amount of air is large is disposed at a position lower than the air-liquid interface when the amount of air is small. In particular, when the air-liquid interface is lowered below the air-bubble chamber filter, foreign substances generated at the air-liquid interface cannot be collected with the air-bubble chamber filter, and the foreign substances flow into the supply flow path.

SUMMARY

A liquid ejecting apparatus that solves the problem described above includes an ejecting portion configured to eject a liquid onto a medium, a supply flow path configured to supply the liquid to the ejecting portion, a liquid storage unit coupled to the supply flow path and configured to store the liquid, the liquid storage unit being formed with an air-liquid interface where the liquid and air are in contact, a first filter provided at a position lower than the air-liquid interface and configured to separate the supply flow path and the liquid storage unit, an adjustment mechanism configured to lift a position of the air-liquid interface in the liquid storage unit, and a control unit configured to control the adjustment mechanism.

BRIEF DESCRIPTION OF THE DRAWINGS

FIG. 1 is a schematic view illustrating one embodiment of a liquid ejecting apparatus.

DESCRIPTION OF EXEMPLARY EMBODIMENTS

Embodiment

Liquid Ejecting Apparatus

Below, an embodiment of a liquid ejecting apparatus will be described with reference to the drawings. For example, the liquid ejecting apparatus is an ink eject-type printer configured to eject ink serving as one example of a liquid onto a medium such as a sheet, fiber, vinyl, a plastic component, a metal component, to perform printing.

In the drawings, on the assumption that a liquid ejecting apparatus 11 is placed on a horizontal surface, the direction of gravity is illustrated as the Z-axis, and directions along the horizontal surface are illustrated using the X-axis and the Y-axis. The X-axis, the Y-axis, and the Z-axis are perpendicular to each other. In the following description, a direction parallel to the Z-axis is also referred to as a vertical direction Z, the upward direction of the vertical direction Z is simply referred to as an upper direction or upward, and the downward direction of the vertical direction Z is simply referred to as a downward direction or downward.

The liquid ejecting apparatus 11 includes an ejecting portion 12, a supplying mechanism 13, an adjustment mechanism 14, and a control unit 15. The liquid ejecting apparatus 11 may include a mounting portion 16. A liquid supply source 17 configured to accommodate a liquid is attached to the mounting portion 16 in a detachable manner. The liquid supply source 17 may be able to replenish the liquid. When configured to be able to replenish the liquid, the liquid supply source 17 may be fixed to the mounting portion 16.

The ejecting portion 12 includes a plurality of nozzles 19. The ejecting portion 12 is able to eject a liquid onto a medium that is not illustrated. The ejecting portion 12 ejects the liquid from the nozzles 19 to perform printing on the medium. The ejecting portion 12 may be of a serial type configured to eject a liquid while moving, thereby performing printing. The ejecting portion 12 may be of a line type that is provided so as to be elongated in the width direction of the medium and configured to eject a liquid to the medium being transported, thereby performing printing.

The supplying mechanism 13 includes a supply flow path 21, a liquid storage unit 22, and a first filter 23. The supplying mechanism 13 may include a second flexible film 24, a driving unit 25, a second filter 26, a branch portion 27, a branch flow path 28, a pump 29, and a liquid-level detecting sensor 30.

The upstream end of the supply flow path 21 may be configured with a supply hand 32. The supply hand 32 is provided at the mounting portion 16. The supply hand 32 is inserted into the liquid supply source 17 attached at the mounting portion 16. This configuration makes it possible to lead out the liquid accommodated in the liquid supply source 17.

The supply flow path 21 is configured to be able to supply the liquid to the ejecting portion 12. The supply flow path 21 supplies the liquid to the ejecting portion 12 from the liquid supply source 17 attached at the mounting portion 16. The supply flow path 21 may supply the liquid with the hydraulic head. In the present embodiment, a direction in which a liquid flows through the supply flow path 21 is referred to as a liquid delivery direction D. The supply flow path 21 is configured such that the upstream end thereof in the liquid delivery direction D is coupled to the liquid supply source 17 and the downstream end thereof in the liquid delivery direction D is coupled to the ejecting portion 12.

The supply flow path 21 may include a supply chamber 34. The supply chamber 34 is disposed at a position lower than the liquid storage unit 22. The supply chamber 34 is separated from the liquid storage unit 22 by the first filter 23. The supply chamber 34 is a space disposed below the first filter 23. The liquid supplied from the liquid supply source 17 passes through the supply chamber 34 and is supplied to the ejecting portion 12. The liquid within the supply chamber 34 passes through the first filter 23 due to a difference in pressure between the inside of the supply chamber 34 and the inside of the liquid storage unit 22. That is, it is possible that the liquid passes from the supply chamber 34 through the first filter 23 and enters the liquid storage unit 22. It is possible that the liquid within the liquid storage unit 22 passes through the first filter 23 and enters the supply chamber 34.

The second flexible film 24 is provided at a position lower than the first filter 23. The second flexible film 24 may constitute a portion of a wall surface of the supply chamber 34. For example, the second flexible film 24 may constitute a bottom of the supply chamber 34. The second flexible film 24 is able to deform. The second flexible film 24 may be made, for example, of a material having elasticity such as silicone rubber.

The driving unit 25 is able to move the second flexible film 24 to a second retracted position illustrated as the solid line in FIG. 1 and a second advanced position illustrated as the long dashed double-short dashed line in FIG. 1. The second advanced position is a position located more toward the first filter 23 side than the second retracted position. By moving the second flexible film 24, the driving unit 25 varies the volume of the supply flow path 21. Specifically, the driving unit 25 pushes the second flexible film 24 to move it from the second retracted position to the second advanced position, thereby reducing the volume of the supply chamber 34.

The liquid storage unit 22 is coupled to the supply flow path 21. The liquid storage unit 22 is provided at a position higher than the supply flow path 21. The liquid storage unit 22 is able to store a liquid. The liquid storage unit 22 is able to collect air bubbles in the liquid. In the present embodiment, air bubbles collected in the liquid storage unit 22 are also referred to as air. An air-liquid interface 36 where the liquid and the air are in contact is formed in the liquid storage unit 22. The air-liquid interface 36 is an upper surface of the stored liquid, and is also referred to as a liquid level.

The supply flow path 21 and the liquid storage unit 22 are separated by the first filter 23. The first filter 23 may be provided horizontally or may be provided so as to be sloped. In the present embodiment, the supply chamber 34 is a space disposed lower than the first filter 23, and the liquid storage unit 22 is a space higher than the first filter 23. Thus, when the air-liquid interface 36 exists in the liquid storage unit 22, the first filter 23 is provided at a position lower than the air-liquid interface 36. At least a portion of the air-liquid interface 36 existing in the liquid storage unit 22 is aligned with at least a portion of the first filter 23 in the vertical direction Z. The liquid storage unit 22, the first filter 23, and the supply chamber 34 are aligned in the vertical direction Z.

The second filter 26 may be disposed in the supply flow path 21 and downstream of the liquid storage unit 22 in the liquid delivery direction D. The second filter 26 may be disposed downstream of the supply chamber 34 in the liquid delivery direction D. The second filter 26 may be disposed between the supply chamber 34 and the branch portion 27 in the liquid delivery direction D.

For the first filter 23 and the second filter 26, it may be possible to use, for example, a net-shape body, a porous body, a porous plate having very small through holes, or the like. The filter having a net-shape body includes a gold net, a net made of resin, a mesh filter, a metal fiber, or the like. The filter having a metal fiber includes a felt filter obtained by forming, into a felt shape, a narrow wire made of stainless steel, a metal sintered filter obtained by applying compressed sintering to a narrow wire made of stainless steel, or the like. The filter having a porous plate includes an electroforming metal filter, an electron-beam processed metal filter, a laser-beam processed metal filter, or the like.

The first filter 23 and the second filter 26 may be the same filter, or the type of and the shape of these filters may differ from each other. For example, the second filter 26 may have a finer mesh than that of the first filter 23.

At the branch portion 27, the branch flow path 28 branches from the supply flow path 21. That is, the branch flow path 28 is separated from the supply flow path 21 at a position downstream of the liquid storage unit 22 in the liquid delivery direction D. The branch flow path 28 branches at a position downstream of the supply chamber 34 in the liquid delivery direction D. In the present embodiment, one side of the branch flow path 28 that branches from the supply flow path 21 is also referred to as one end side, and the opposite side thereof is also referred to as the other end side. The one end side of the branch flow path 28 is coupled to the branch portion 27. The other end side of the branch flow path 28 is coupled to the liquid storage unit 22. The branch flow path 28 couples the supply flow path 21 and the liquid storage unit 22.

The pump 29 causes a liquid within the branch flow path 28 to flow. At the branch flow path 28, the pump 29 causes the liquid to flow from the one end side toward the other end side. Through the branch flow path 28, the pump 29 delivers, to the liquid storage unit 22, the liquid delivered from the supply chamber 34 toward the downstream in the liquid delivery direction D. The pump 29 circulates the liquid at the supply chamber 34, the supply flow path 21 between the supply chamber 34 and the branch portion 27, the branch flow path 28, and the liquid storage unit 22. The liquid circulates while passing through the first filter 23 and the second filter 26.

The liquid-level detecting sensor 30 detects that the position of the air-liquid interface 36 is located at a predetermined position higher than the first filter 23. For example, the liquid-level detecting sensor 30 may be a sensor configured to detect that the liquid is in contact. The liquid-level detecting sensor 30 may include an electrode provided at a predetermined position in the liquid storage unit 22. The liquid-level detecting sensor 30 may sense a resistance that varies according to whether the liquid is brought into contact with an electrode or the liquid is not brought into contact with the electrode, thereby detecting that the air-liquid interface 36 is lowered to a predetermined position. The predetermined position may be higher than the position where the branch flow path 28 is coupled.

The adjustment mechanism 14 may include a first flexible film 38, a valve portion 39, and a suction unit 40.

The first flexible film 38 is able to deform. The first flexible film 38 may be provided at a position higher than the air-liquid interface 36. The first flexible film 38 may be provided at a position higher than the liquid-level detecting sensor 30. The first flexible film 38 may constitute a portion of a wall surface of the liquid storage unit 22. For example, the first flexible film 38 may constitute a ceiling of the liquid storage unit 22.

The first flexible film 38 is able to move to a first retracted position indicated as the solid line in FIG. 1 and a first advanced position indicated as the long dashed double-short dashed line in FIG. 1. The first advanced position is a position located more toward the air-liquid interface 36 side than the first retracted position. The first advanced position is a position closer to the first filter 23 than the first retracted position. The first flexible film 38 moves in association with a change in pressure within the liquid storage unit 22. The first flexible film 38 may be made, for example, of a material having elasticity such as silicone rubber.

The valve portion 39 is provided in the supply flow path 21 and at the upstream side of the liquid storage unit 22 in the liquid delivery direction D. The valve portion 39 is provided at the upstream side of the supply chamber 34 in the liquid delivery direction D. When opening, the valve portion 39 allows the liquid in the supply flow path 21 to flow. When closing, the valve portion 39 restricts the flow of the liquid in the supply flow path 21.

The suction unit 40 may include a cap 42, a discharge flow path 43, a pressure reducing portion 44, and a liquid-waste accommodating portion 45. The liquid-waste accommodating portion 45 may be provided so as to be detachable to or from the liquid ejecting apparatus 11.

The cap 42 is able to accommodate the liquid discharged from the nozzles 19. The cap 42 may include a lip portion 46. The lip portion 46 is provided in an annular manner to form an opening of the cap 42.

The cap 42 may be provided so as to be able to move to a capping position (not illustrated) in which the ejecting portion 12 is capped, and a distance position (illustrated in FIG. 1) in which the ejecting portion 12 is opened.

When the cap 42 is disposed at the capping position, the lip portion 46 is in contact with the ejecting portion 12. When the cap 42 is disposed at the capping position, the opening of the cap 42 is closed with the ejecting portion 12 to form a closed space in which the nozzles 19 are opened. When the lip portion 46 is made, for example, of rubber, elastomer, or the like that elastically deforms, it is possible to enhance the sealing property of the closed space. When the cap 42 is disposed at the distance position, the lip portion 46 is spaced apart from the ejecting portion 12. When the cap 42 is disposed at the distance position, the opening of the cap 42 is opened.

The discharge flow path 43 has an upstream end coupled to the cap 42 and a downstream end coupled to the liquid-waste accommodating portion 45. The discharge flow path 43 may be configured, for example, with a tube that is able to deform so as to follow the movement of the cap 42. The discharge flow path 43 is configured to be able to discharge the liquid within the cap 42 to the liquid-waste accommodating portion 45.

The pressure reducing portion 44 may be provided at the discharge flow path 43. The pressure reducing portion 44 is, for example, a tube pump. The pressure reducing portion 44 is configured to be able to reduce the pressure of a space within the cap 42 through the discharge flow path 43.

The suction unit 40 performs a suction operation by causing the pressure reducing portion 44 to reduce the pressure within the cap 42 in a state in which the cap 42 is disposed at the capping position. As the pressure within the cap 42 reduces, the liquid is discharged from the nozzles 19, and the liquid is supplied from the supply flow path 21 to the ejecting portion 12. That is, the suction unit 40 performs the suction operation to suction the liquid within the liquid storage unit 22 to cause the liquid within the liquid storage unit 22 to flow downstream in the liquid delivery direction D. The liquid within the liquid storage unit 22 passes through the first filter 23 and the supply chamber 34, and flows downstream in the liquid delivery direction D.

The control unit 15 controls the adjustment mechanism 14. The control unit 15 comprehensively controls driving of each mechanism in the liquid ejecting apparatus 11 to control various types of operations performed in the liquid ejecting apparatus 11. The control unit 15 may be configured as a circuit including a: one or more processors configured to perform various types of processing in accordance with a computer program, one or more dedicated hardware circuits configured to perform at least portion of processes among the various types of processes, or y: a combination of them. The hardware circuit is, for example, an integrated circuit for a specific application. The processor includes a CPU and a memory such as a RAM and ROM. The memory holds a program code and an instruction configured to cause the CPU to perform processes. The memory, that is, a computer readable medium includes any readable medium accessible by a general purpose or special purpose computer.

Operation of Embodiment

Operation according the present embodiment will be described.

Air bubbles may enter the supply flow path 21. Air bubbles in the supply flow path 21 may exist, for example, as a result of air coming from the supply hand 32 in association with operation of attaching or detaching the liquid supply source 17 to or from the supply hand 32. Air bubbles may occur, for example, as a result of air dissolved in the liquid being changed into gas. Air bubbles together with the liquid flow through the supply flow path 21 in the liquid delivery direction D. Air bubbles delivered to the supply chamber 34 pass through the first filter 23 due to buoyant force, and gather at the liquid storage unit 22.

However, for example, depending on the type of the first filter 23, the size of the air bubble, or the like, the air bubbles do not pass through the first filter 23 and may stay below the first filter 23. The control unit 15 may be configured to control driving of the driving unit 25 to deliver, to the liquid storage unit 22, the air bubbles within the supply chamber 34.

Specifically, the driving unit 25 causes the second flexible film 24 to move in a state in which the air-liquid interface 36 is disposed at a position higher than the first filter 23. The driving unit 25 causes the second flexible film 24 to move from the second retracted position illustrated as the solid line in FIG. 1 to the second advanced position illustrated as the long dashed double-short dashed line illustrated in FIG. 1, thereby reducing the volume of the supply flow path 21. As the second flexible film 24 moves from the second retracted position to the second advanced position, the volume of the supply chamber 34 reduces and the pressure within the supply chamber 34 increases. This makes it easy for air bubbles within the supply chamber 34 to pass through the first filter 23.

Air bubbles collected at the liquid storage unit 22 form air mass, and also form the air-liquid interface 36 between the air and the liquid. That is, as the air-liquid interface 36 is a place where the liquid is in contact with the air, the front surface of the liquid is more likely to dry. The liquid of which front surface dries is locally condensed. This may result in occurrence of distribution breakage. For example, when the liquid contains resin components, these resins bond together. This increases the size of particles to form foreign substances. These formed foreign substances are less likely to be dissolved in the liquid again. Thus, the foreign substances that have already been generated are more likely to stay there. However, the first filter 23 is provided between the air-liquid interface 36 and the supply flow path 21. The first filter 23 collects foreign substances to keep the foreign substances staying in the liquid storage unit 22.

The air-liquid interface 36 in the liquid storage unit 22 moves in accordance with the amount of air within the liquid storage unit 22. Specifically, the air-liquid interface 36 is lowered by the amount of increased air. The adjustment mechanism 14 is configured to be able to lift the position of the air-liquid interface 36 within the liquid storage unit 22. The control unit 15 lifts the air-liquid interface 36 before the liquid storage unit 22 is fully filled with air. The control unit 15 raises the air-liquid interface 36 before the air-liquid interface 36 is lowered to the first filter 23.

In the present embodiment, when the air-liquid interface 36 is lowered to the predetermined position, the control unit 15 controls the adjustment mechanism 14 to raise the air-liquid interface 36, on the basis of detection by the liquid-level detecting sensor 30. For example, when the liquid-level detecting sensor 30 switches from a state in which the liquid is detected to a state in which the liquid is not detected, the control unit 15 may determine that the air-liquid interface 36 is lowered to the predetermined position.

In order to lift the air-liquid interface 36, the control unit 15 first performs a lowering operation. In the lowering operation, the air-liquid interface 36 is lowered by causing the suction unit 40 to perform the suction operation in a state in which the valve portion 39 is closed. In the lowering operation, the pressure within the liquid storage unit 22 is reduced. Thus, in association with the lowering operation, the first flexible film 38 moves from the first retracted position illustrated as the solid line in FIG. 1 to the first advanced position illustrated as the long dashed double-short dashed line in FIG. 1. The first flexible film 38 reduces the volume of the liquid storage unit 22.

When the air-liquid interface 36 is lowered to a position lower than the first filter 23, the air-liquid interface 36 is formed in the supply chamber 34. Thus, air stored in the liquid storage unit 22 is delivered downstream in the liquid delivery direction D through the supply chamber 34. That is, the liquid storage unit 22 is brought into a state in which air is discharged and the pressure therein is reduced. Thus, when the valve portion 39 is opened in a state in which the air-liquid interface 36 is lowered to a position lower than the first filter 23 through the lowering operation, the air-liquid interface 36 rises to a position higher than the position before the lowering operation is performed. The control unit 15 may cause the valve portion 39 to open after the suction operation is stopped or may cause the valve portion 39 to open while the suction operation is being performed.

Effects of Embodiment

Effects of the present embodiment will be described.

(1) The first filter 23 separates the supply flow path 21 and the liquid storage unit 22. The adjustment mechanism 14 adjusts the height of the air-liquid interface 36 within the liquid storage unit 22. Thus, by controlling the adjustment mechanism 14, the control unit 15 is able to adjust the air-liquid interface 36 to be disposed higher than the first filter 23. That is, it is possible to maintain a state in which the first filter 23 is provided at a position lower than the air-liquid interface 36. This makes it possible to reduce a possibility that foreign substances generated at the air-liquid interface 36 flow downstream of the liquid storage unit 22.

(2) The control unit 15 closes the valve portion 39 and performs the suction operation to lower the air-liquid interface 36 to a position lower than the first filter 23. With this operation, air within the liquid storage unit 22 together with the liquid is delivered downstream in the liquid delivery direction D. Thus, as the valve portion 39 is opened and the liquid is supplied from the upstream in the liquid delivery direction D, the air-liquid interface 36 in the liquid storage unit 22 rises to a position higher than the original position. Thus, with a simplified configuration, it is possible to lift the air-liquid interface 36.

(3) As the first flexible film 38 moves from the first retracted position to the first advanced position in association with the lowering operation, the volume of the liquid storage unit 22 reduces. Thus, with the lowering operation, it is possible to easily lower the air-liquid interface 36 and also easily raise the air-liquid interface 36 by opening the valve portion 39.

(4) The air-liquid interface 36 is lowered, for example, in association with an increase in the amount of air within the liquid storage unit 22. When the air-liquid interface 36 is lowered to the predetermined position, the control unit 15 controls the adjustment mechanism 14 to raise the air-liquid interface 36. The predetermined position is a position higher than the first filter 23. Thus, it is possible to place the air-liquid interface 36 at a position higher than the first filter 23.

(5) In some cases, air bubbles in the supply flow path 21 do not pass through the first filter 23 and may stay below the first filter 23. In this regard, the driving unit 25 causes the second flexible film 24 to move from the second retracted position to the second advanced position to reduce the volume of the supply flow path 21. This increases the pressure within the supply flow path 21, which makes it easy for air bubbles staying below the first filter 23 to pass through the first filter 23. Thus, it is possible to easily collect air bubbles in the liquid storage unit 22.

(6) The second filter 26 is provided in the supply flow path 21 disposed downstream of the liquid storage unit 22. The second filter 26 has a mesh finer than the first filter 23. Thus, when foreign substances pass through the first filter 23, it is possible to collect the foreign substances with the second filter 26.

(7) The branch flow path 28 couples the liquid storage unit 22 and the supply flow path 21 disposed downstream of the liquid storage unit 22. The pump 29 causes the liquid within the branch flow path 28 to flow. The liquid is delivered to the supply flow path 21, the branch flow path 28, and the liquid storage unit 22 in this order, and circulates through the first filter 23. Thus, when a liquid that settles is used, it is possible to reduce the settling.

Modification Examples

The present embodiment can be modified in the following manner, and be implemented. The present embodiment and the following modification examples can be implemented in combination within a range in which no technical contradiction arises.

The supplying mechanism 13 may include a supply pump configured to deliver a liquid from the liquid supply source 17 to the ejecting portion 12. The supply pump may be provided in the supply flow path 21 and upstream of the supply chamber 34 in the liquid delivery direction D. The supply pump may be provided in the supply flow path 21 and downstream of the supply chamber 34 in the liquid delivery direction D.

The pump 29 may be provided in the supply flow path 21 between the first filter 23 and the branch portion 27 in the liquid delivery direction D. The liquid ejecting apparatus 11 may include a downstream valve provided at the ejecting portion 12 or provided in the supply flow path 21 and downstream of the branch portion 27 in the liquid delivery direction D. The pump 29 may be configured to be driven in a state in which the downstream valve is opened, and supply the liquid to the nozzles 19. The pump 29 may be configured to be driven in a state in which the downstream valve is closed, and cause the liquid to flow from one end side of the branch flow path 28 toward the other end side.

The branch portion 27 may be provided at the ejecting portion 12. The branch flow path 28 may couple the ejecting portion 12 and the liquid storage unit 22. The pump 29 may circulate the liquid through the supply chamber 34, the supply flow path 21 downstream of the supply chamber 34 in the liquid delivery direction D, the ejecting portion 12, the branch flow path 28, and the liquid storage unit 22.

The mesh size of the second filter 26 may be equal to that of the first filter 23. The mesh size of the second filter 26 may be rougher than that of the first filter 23. By setting the mesh of the second filter 26 to be rougher than that of the first filter 23, it is possible to reduce the pressure loss. The second filter 26 may be provided at an outlet where the liquid flows out from the supply chamber 34. The second filter 26 may be configured to collect air bubbles and cause the air bubbles to stay in the supply chamber 34 to make air bubbles more likely to gather at the liquid storage unit 22. The second filter 26 may be provided at the ejecting portion 12.

The driving unit 25 may move the first flexible film 38. For example, the driving unit 25 may be configured to move the first flexible film 38 from the first advanced position to the first retracted position to reduce the pressure within the liquid storage unit 22, whereby air bubbles within the supply chamber 34 are moved to the liquid storage unit 22.

The liquid-level detecting sensor 30 may include a prism provided at a predetermined position, a light-emitting unit configured to emit light to the prism, and a light-receiving unit configured to receive light refracted at the prism. Light diffuses in the liquid during a period of time when the liquid is in contact with the prism. As the air-liquid interface 36 is disposed at a position lower than the prism and the prism is exposed from the liquid, the light refracted at the prism reaches the light-receiving unit. The liquid-level detecting sensor 30 may detect the position of the air-liquid interface 36 on the basis of a change in the amount of light received by the light-receiving unit.

The liquid-level detecting sensor 30 may a float sensor configured to detect the position of a float that floats on the liquid.

The liquid-level detecting sensor 30 may be an image sensor configured to detect an image. The liquid-level detecting sensor 30 may be configured to analyze the image detected by the image sensor to detect the position of the air-liquid interface 36.

The liquid-level detecting sensor 30 may be a photoelectric sensor including a light emitting unit configured to emit light, and a light-receiving unit configured to receive light. The light emitting unit and the light-receiving unit may be provided such that the liquid storage unit 22 is interposed between them. The light-receiving unit may receive light that has passed through the liquid storage unit 22. For example, when the air-liquid interface 36 is disposed at a position higher than a predetermined position, light is blocked by the liquid lying between the light emitting unit and the light-receiving unit. The liquid-level detecting sensor 30 may detect the position of the air-liquid interface 36 on the basis of a change in the amount of light received by the light-receiving unit.

The suction unit 40 may be used for maintenance of the ejecting portion 12. The suction unit 40 may be configured to perform the suction operation to perform suction cleaning in which a liquid is discharged from the nozzles 19. The suction cleaning is maintenance in which a liquid having increased viscosity and air bubbles at and around the nozzles 19 are caused to be discharged.

At least a portion of the first flexible film 38 may constitute a side wall of the liquid storage unit 22. A portion of the first flexible film 38 may be disposed at a position lower than the air-liquid interface 36.

The liquid storage unit 22 may be configured such that the volume thereof does not change. The liquid storage unit 22 may be made of a hard material. The liquid storage unit 22 may be opened to the atmosphere. That is, the atmospheric pressure may act on the air-liquid interface 36. The adjustment mechanism 14 may be configured to include, for example, a supply pump provided upstream of the supply chamber 34 in the liquid delivery direction D and such that the supply pump supplies the liquid to the supply chamber 34 to raise the air-liquid interface 36 in the liquid storage unit 22.

The adjustment mechanism 14 may include a pressure reducing pump configured to reduce the pressure within the liquid storage unit 22. The adjustment mechanism 14 may be configured such that the pressure reducing pump reduces the pressure within the liquid storage unit 22 to raise the air-liquid interface 36.

A portion of the first filter 23 may be disposed at a position lower than an inlet where a liquid is caused to flow into the supply chamber 34. A portion of the first filter 23 may be disposed at a position lower than an outlet where the liquid is caused to flow out from the supply chamber 34.

The liquid storage unit 22 may be configured to adjust the pressure in the supply flow path 21. As the pressure in the supply flow path 21 changes, the volume of air in the liquid storage unit 22 changes. This makes it possible to moderate the change in the pressure in the supply flow path 21. The liquid storage unit 22 may alleviate the change in the pressure within the supply flow path 21 by causing the first flexible film 38 to move to change the volume.

The liquid ejecting apparatus 11 may be a liquid ejecting apparatus configured to eject or eject a liquid other than ink. The state of the liquid discharged from the liquid ejecting apparatus as a very small amount of liquid droplet includes a particle shape, a teardrop shape, and a fiber shape having a tail. For the liquid as used herein, it may be possible to use any material as long as the liquid ejecting apparatus can eject the material. For example, the liquid may be any liquid phase substance, and includes a liquid body having high viscosity or low viscosity, sol, gel water, and a fluid body such as inorganic solvent, organic solvent, solution, liquid-like resin, liquid-like metal, or melted metal. The liquid not only includes a liquid as one state of a substance but also includes a substance obtained by dissolving, dispersing, or mixing, in a solvent, particles made of a functional material comprised of a solid substance such as pigment or metal particle. A typical example of the liquid includes ink as described in the embodiment above, liquid crystal, or the like. Here, the ink includes various liquid compositions such as general water-based ink, oil-based ink, gel ink, or hot melt ink. A specific example of the liquid ejecting apparatus includes a device configured to eject a liquid containing a material such as an electrode material or a color material in a state of being dispersed or dissolved, which is used in manufacturing or the like of a liquid crystal display, an electroluminescence display, a field emission display, or a color filter. The liquid ejecting apparatus may be a device configured to eject a bioorganic material used in manufacturing a bio chip, a device used as an accurate pipette and configured to eject a liquid serving as a sample, a printing machine, a microdispenser, or the like. The liquid ejecting apparatus may be a device configured to eject lubricant oil by pinpoint to a precision machine such as a watch or a camera, or a device configured to eject a transparent resin solution such as an ultraviolet curing resin onto a substrate so as to form a micro-hemispherical lens, an optical lens or the like used in an optical communication element or the like. The liquid ejecting apparatus may be a device configured to eject an etching solution such as acid or alkali so as to etch a substrate or the like.

Supplementary Note

Below, description will be made of technical ideas or operation and effect thereof obtained on the basis of the embodiment and the modification examples described above.

(A) A liquid ejecting apparatus includes: an ejecting portion configured to eject a liquid onto a medium; a supply flow path configured to supply the liquid to the ejecting portion; a liquid storage unit coupled to the supply flow path and configured to store the liquid, the liquid storage unit being a unit in which an air-liquid interface where the liquid and air are in contact is formed; a first filter provided at a position lower than the air-liquid interface and configured to separate the supply flow path and the liquid storage unit; an adjustment mechanism configured to lift a position of the air-liquid interface in the liquid storage unit; and a control unit configured to control the adjustment mechanism.

With this configuration, the first filter separates the supply flow path and the liquid storage unit. The adjustment mechanism is able to adjust the height position of the air-liquid interface within the liquid storage unit. Thus, by controlling the adjustment mechanism, the control unit is able to adjust the air-liquid interface so as to be disposed at a position higher than the first filter. That is, it is possible to maintain a state in which the first filter is provided at a position lower than the air-liquid interface. This makes it possible to reduce a possibility that foreign substances generated at the air-liquid interface flow downstream of the liquid storage unit.

(B) The liquid ejecting apparatus may be configured such that, when a direction of the liquid flowing through the supply flow path is referred to as a liquid delivery direction, the adjustment mechanism includes: a valve portion provided in the supply flow path at an upstream side of the liquid storage unit in the liquid delivery direction; and a suction unit configured to perform a suction operation in which the liquid within the liquid storage unit is suctioned to cause the liquid to flow downstream in the liquid delivery direction, the control unit performs a lowering operation in which the suction operation is performed in a state in which the valve portion is closed, thereby causing the air-liquid interface to be lowered, and the control unit opens the valve portion in a state in which the air-liquid interface is lowered below the first filter through the lowering operation.

With this configuration, the control unit causes the suction operation in a state in which the valve portion is closed, thereby causing the air-liquid interface to be lowered below the first filter. This causes air within the liquid storage unit together with the liquid to be delivered downstream in the liquid delivery direction. Thus, as the valve portion is opened and the liquid is supplied from the upstream in the liquid delivery direction, the air-liquid interface in the liquid storage unit is raised to a position higher than the original position. This makes it possible to lift the air-liquid interface with a simplified configuration.

(C) The liquid ejecting apparatus may be configured such that the adjustment mechanism includes a first flexible film provided at a position higher than the air-liquid interface, the first flexible film is configured to move to a first retracted position and a first advanced position located more toward a side of the air-liquid interface than the first retracted position, and the first flexible film moves from the first retracted position to the first advanced position in association with the lowering operation, to reduce a volume of the liquid storage unit.

With this configuration, the first flexible film moves from the first retracted position to the first advanced position in association with the lowering operation, thereby reducing the volume of the liquid storage unit. This makes it possible to easily lower the air-liquid interface through the lowering operation, and also easily raise the air-liquid interface by opening the valve portion.

(D) The liquid ejecting apparatus may be configured to include a liquid-level detecting sensor configured to detect that a position of the air-liquid interface is located at a predetermined position higher than the first filter, in which, when the air-liquid interface is lowered to the predetermined position, the control unit controls the adjustment mechanism on a basis of detection by the liquid-level detecting sensor to raise the air-liquid interface.

For example, the air-liquid interface is lowered in association with an increase in the volume of air within the liquid storage unit. With this configuration, when the air-liquid interface is lowered to the predetermined position, the control unit controls the adjustment mechanism to raise the air-liquid interface. The predetermined position is a position higher than the first filter. Thus, it is possible to cause the air-liquid interface to be disposed at a position higher than the first filter.

(E) The liquid ejecting apparatus may be configured to further include a second flexible film provided at a position lower than the first filter, and a driving unit configured to move the second flexible film to a second retracted position and to a second advanced position located more toward a side of the first filter than the second retracted position, in which the driving unit causes the second flexible film to move from the second retracted position to the second advanced position in a state in which the air-liquid interface is disposed at a position higher than the first filter, thereby reducing a volume of the supply flow path.

In some cases, air bubbles in the supply flow path do not pass through the first filter and may stay below the first filter. In this regard, with this configuration, the driving unit causes the second flexible film to move from the second retracted position to the second advanced position to reduce the volume of the supply flow path. This increases the pressure within the supply flow path, which makes it easy for air bubbles staying below the first filter to pass through the first filter. Thus, it is possible to easily collect air bubbles in the liquid storage unit.

(F) The liquid ejecting apparatus may be configured to further include a second filter provided in the supply flow path and downstream of the liquid storage unit in a liquid delivery direction when the liquid delivery direction represents a direction of the liquid flowing through the supply flow path, in which the second filter has a mesh finer than the first filter.

With this configuration, the second filter is provided in the supply flow path disposed downstream of the liquid storage unit. The second filter has a mesh finer than the first filter. Thus, even when foreign substances pass through the first filter, the foreign substances are collected by the second filter.

(G) The liquid ejecting apparatus may be configured to further include: a branch flow path separated from the supply flow path at a position downstream of the liquid storage unit in a liquid delivery direction when the liquid delivery direction represents a direction of the liquid flowing through the supply flow path; and a pump configured to cause the liquid to flow in the branch flow path, in which, when a side of the branch flow path that branches from the supply flow path is referred to as one end side and an opposite side therefrom is referred to as another end side, the pump causes the liquid to flow from the one end side toward the other end side, and the other end side is coupled to the liquid storage unit.

With this configuration, the branch flow path couples the liquid storage unit and the supply flow path disposed downstream of the liquid storage unit. The pump causes the liquid within the branch flow path to flow. The liquid is delivered to the supply flow path, the branch flow path, and the liquid storage unit in this order, and circulates through the first filter. Thus, when a liquid that settles is used, it is possible to reduce the settling.

What is claimed is:

1. A liquid ejecting apparatus, comprising:

an ejecting portion configured to eject a liquid onto a medium;

a supply flow path configured to supply the liquid to the ejecting portion;

a liquid storage unit coupled to the supply flow path and configured to store the liquid, the liquid storage unit being formed with an air-liquid interface where the liquid and air are in contact;

a first filter provided at a position lower than the air-liquid interface and configured to separate the supply flow path and the liquid storage unit;

an adjustment mechanism configured to lift a position of the air-liquid interface in the liquid storage unit; and a control unit configured to control the adjustment mechanism.

2. The liquid ejecting apparatus according to claim 1, wherein, when a direction of the liquid flowing through the supply flow path is referred to as a liquid delivery direction, the adjustment mechanism includes:

a valve portion provided at the supply flow path on upstream of the liquid storage unit in the liquid delivery direction; and a suction unit configured to perform a suction operation in which the liquid in the liquid storage unit is suctioned to cause the liquid to flow downstream in the liquid delivery direction, and the control unit performs a lowering operation for lowering the air-liquid interface by performing the suction operation in a state in which the valve portion is closed, and opens the valve portion in a state in which the air-liquid interface is lowered below the first filter through the lowering operation.

3. The liquid ejecting apparatus according to claim 2, wherein the adjustment mechanism includes a first flexible film provided at a position higher than the air-liquid interface, the first flexible film is configured to move to a first retracted position and to a first advanced position located closer to the air-liquid interface than the first retracted position, and the first flexible film moves from the first retracted position to the first advanced position in association with the lowering operation, to reduce a volume of the liquid storage unit.

4. The liquid ejecting apparatus according to claim 3, further comprising:

a second flexible film provided at a position lower than the first filter; and a driving unit configured to move the second flexible film to a second retracted position and to a second advanced position located closer to the first filter than the second retracted position, wherein the driving unit moves the second flexible film from the second retracted position to the second advanced position in a state in which the air-liquid interface is located at a position higher than the first filter, to reduce a volume of the supply flow path.

5. The liquid ejecting apparatus according to claim 1, comprising a liquid-level detecting sensor configured to detect that a position of the air-liquid interface is located at a predetermined position higher than the first filter, wherein when the air-liquid interface is lowered to the predetermined position, the control unit controls the adjustment mechanism based on the detection by the liquid-level detecting sensor, to raise the air-liquid interface.

6. The liquid ejecting apparatus according to claim 1, further comprising a second filter provided at the supply flow path on downstream of the liquid storage unit in a liquid delivery direction when the liquid delivery direction represents a direction of the liquid flowing through the supply flow path, wherein the second filter is finer than the first filter.

7. The liquid ejecting apparatus according to claim 1, further comprising:

a branch flow path separated from the supply flow path on downstream of the liquid storage unit in a liquid delivery direction when the liquid delivery direction represents a direction of the liquid flowing through the supply flow path; and a pump configured to cause the liquid to flow in the branch flow path, wherein, when a side, of the branch flow path, separated from the supply flow path is referred to as one end side, and an opposite side of the branch flow path is referred to as another end side, the pump causes the liquid to flow from the one end side toward the other end side, and the other end side is coupled to the liquid storage unit.

8. A control method of a liquid ejecting apparatus that includes an ejecting portion configured to eject a liquid onto a medium, a supply flow path configured to supply the liquid to the ejecting portion, a liquid storage unit coupled to the supply flow path and configured to store the liquid, the liquid storage unit being formed with an air-liquid interface where the liquid and air are in contact, a first filter provided at a position lower than the air-liquid interface and configured to separate the supply flow path and the liquid storage unit, and an adjustment mechanism configured to lift a position of the air-liquid interface in the liquid storage unit, when a direction of the liquid flowing through the supply flow path is referred to as a liquid delivery direction, the adjustment mechanism includes:

a valve portion provided at the supply flow path on upstream of the liquid storage unit in the liquid delivery direction; and a suction unit configured to perform a suction operation in which the liquid in the liquid storage unit is suctioned to cause the liquid to flow downstream in the liquid delivery direction, the method comprising:

performing a lowering operation for lowering the air-liquid interface by performing the suction operation in a state in which the valve portion is closed;

opening the valve portion in a state in which the air-liquid interface is lowered below the first filter through the lowering operation.

* * * * *